(12) United States Patent
Ooba

(10) Patent No.: US 8,289,547 B2
(45) Date of Patent: Oct. 16, 2012

(54) PRINT CONTROL APPARATUS, PRINT CONTROL METHOD AND MEDIUM STORING A PRINT CONTROL PROGRAM THEREOF

(75) Inventor: Hideaki Ooba, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 12/348,844

(22) Filed: Jan. 5, 2009

(65) Prior Publication Data

US 2009/0180139 A1    Jul. 16, 2009

(30) Foreign Application Priority Data

Jan. 16, 2008   (JP) ................. 2008-007206

(51) Int. Cl.
*G06F 15/00* (2006.01)
*G06K 1/00* (2006.01)

(52) U.S. Cl. ............... 358/1.15; 358/1.9; 358/1.13

(58) Field of Classification Search .......... None
See application file for complete search history.

(56) References Cited

FOREIGN PATENT DOCUMENTS

JP    2002-149509    5/2002

*Primary Examiner* — Thierry Pham
(74) *Attorney, Agent, or Firm* — Fitzpatrick, Cella, Harper & Scinto

(57) ABSTRACT

A print control apparatus of the present invention includes a database configured to manage counter information of an image forming apparatus; an obtain unit configured to periodically obtain the counter information from the image forming apparatus; an update unit configured to update the database based on the obtained counter information; a halt unit configured to halt the periodic obtaining of the counter information in response to start notification of processing based on a print job in the image forming apparatus; and a restart unit configured to restart the periodic obtaining of the counter information in response to completion notification of processing based on the print job in the image forming apparatus.

6 Claims, 13 Drawing Sheets

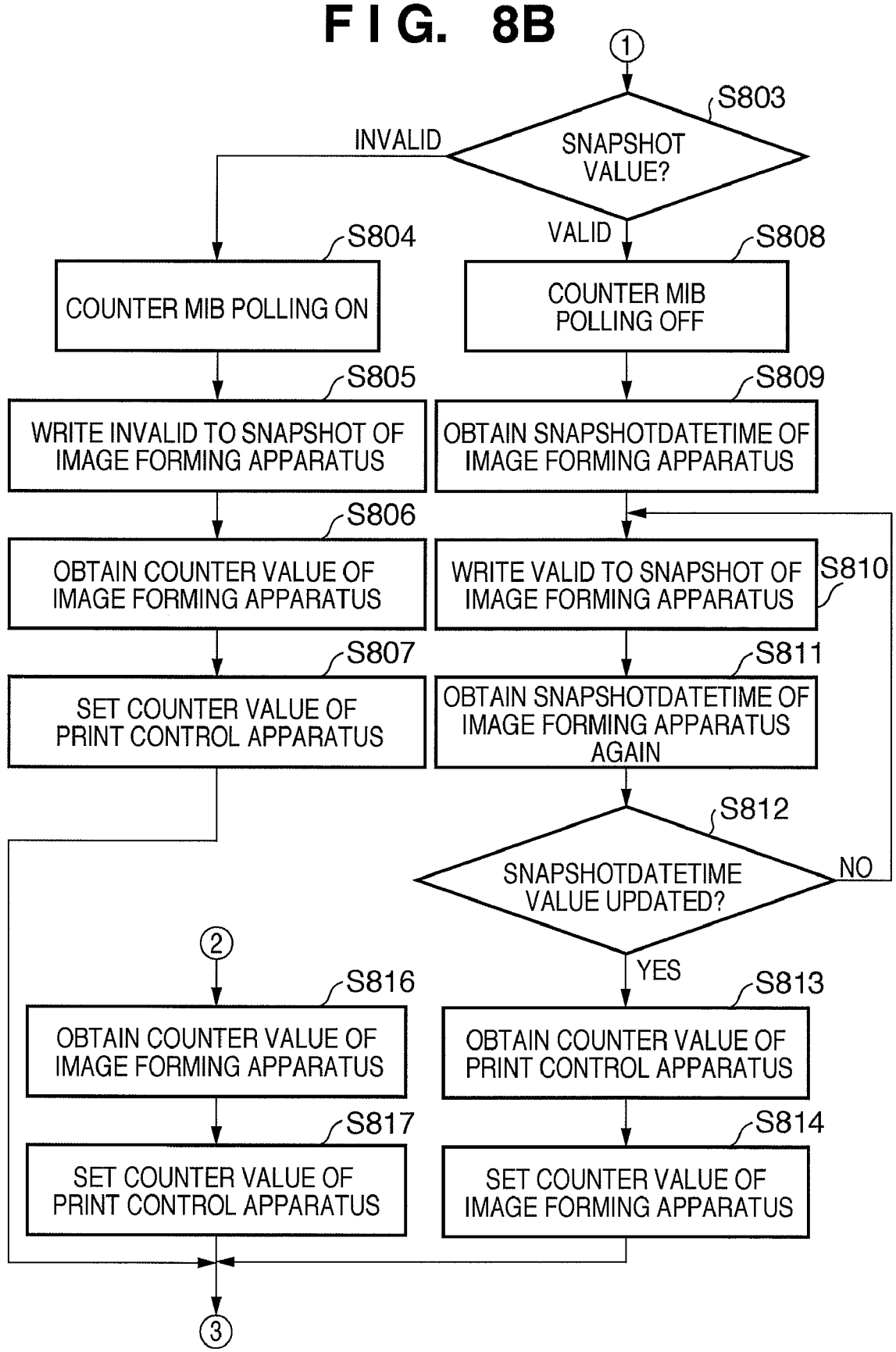

FIG. 9

| PROPERTY | VALUE |
|---|---|
| JOB ID | 12345 |
| TOTAL PRINT PAGE | 10 |
| PRINTED PAGE | 3 |
| PRINT METHOD | DUPLEX |
| NUMBER OF FACE | 2 |
| TOTAL NUMBER OF FACE | 10 |
| COLOR MODE | BLACK/WHITE |
| PRINT SIZE | A3 |

PRINT CONTROL APPARATUS, PRINT CONTROL METHOD AND MEDIUM STORING A PRINT CONTROL PROGRAM THEREOF

BACKGROUND OF THE INVENTION

1. Field of the Invention

The present invention relates to a print control apparatus that obtains data contained in an image forming apparatus, and that synchronizes the obtained data with a database of an image forming apparatus, method and medium storing a program thereof.

2. Description of the Related Art

Hitherto, a network device management method using SNMP (Simple Network Management Protocol) and MIB (Management Information Base) has been widely known. SNMP is a protocol used for managing devices connected to a network via the network. The network management with SNMP is realized by a configuration including a monitoring terminal (one that monitors) that carries out the network management, that is, an SNMP manager, and a management target device (one that is monitored), that is, an SNMP agent. Hereinafter, the SNMP manager is also simply called a manager, and the SNMP agent is also simply called an agent. In such a configuration, communication is made by a manager making a request to an agent, and an agent returning a response to the manager.

MIB refers to a database that is present in a network device compatible with SNMP and that contains management information with regard to the network device. MIB is configured of a plurality of objects, and information to be stored for each of the objects is defined; those devices containing MIB can set information according to such definitions. For the request made by the manager, the agent returns values, as a response, of the requested MIB object. By analyzing the response returned, the manager can detect what kind of network device is set as the management target and what kind of functions are available.

Generally, image forming apparatuses and print control apparatuses are compatible with SNMP in many cases. In such a case, for example, the print control apparatus and the image forming apparatus can operate as agents, and can return a response to a request from a client PC and the like as the manager. When a print control apparatus operates as an agent, first, the print control apparatus operates as a manager and obtains information from the image forming apparatus. Examples of such information include information relating to the image forming apparatus, such as paper remaining information, toner remaining amount information, counter information, and the like. Then, the print control apparatus obtains such information from the image forming apparatus, sets such information as MIB objects of the print control apparatus itself, and thereafter, returns such information in response to the request from the client PC and the like.

The timing for the print control apparatus to obtain information from the image forming apparatus varies depending on objects, and therefore it is necessary that the obtain processing be carried out at appropriate times. For example, there is a method in which objects are obtained only once from the image forming apparatus when the print control apparatus is started. In another method, objects are obtained from the image forming apparatus by polling the image forming apparatus from the print control apparatus. In yet another method, objects are obtained when an event indicating a status change sent from the image forming apparatus is detected. The print control apparatus is able to update values of MIB objects of the print control apparatus's own at appropriate times combining these methods.

However, when the polling is carried out, for example, while the print control apparatus is sending print data to the image forming apparatus, the possibility of causing collision with a print data packet becomes high. Conventionally, there has been a problem in that when the collision occurred, the print data packet is sent again and as a result, the entire print performance is degraded.

Furthermore, conventionally, the print control apparatus carried out data synchronization with the image forming apparatus by a polling cycle set in the print control apparatus. Therefore, it is possible that the MIB information of the image forming apparatus is already updated immediately before the print control apparatus carries out next polling. When the manager in the network sends a request for obtaining MIB of the print control apparatus in such a case, there may be a case when the values in the response from the print control apparatus are different from the actual values. As a result, the manager cannot obtain the latest MIB values from the print control apparatus.

Japanese Patent Laid-Open No. 2002-149509 has disclosed a network management system that can prevent inconsistency with the MIB setting contents that are referred to by the manager and by each agent. According to this network management system, it is noted that the synchronicity of the network definition information owned by the agent and by the manager can be kept without involvement of manpower. However, there is no particular mention of reducing the network load while there is communication of data other than MIB updates such as print data between the manager and the agent.

SUMMARY OF THE INVENTION

The present invention provides a print control apparatus that is capable of updating MIB information of the print control apparatus flexibly without degrading the print performance of the image forming apparatus.

The present invention in its first aspect provides a print control apparatus that is connected to an image forming apparatus via a network, and that receives notification of a processing status of a print job in the image forming apparatus, the print control apparatus comprising: a database configured to manage counter information of the image forming apparatus; an obtain unit configured to periodically obtain the counter information from the image forming apparatus; an update unit configured to update the database based on the counter information obtained by the obtain unit; a halt unit configured to halt the periodic obtaining of the counter information by the obtain unit in response to start notification of processing based on a print job in the image forming apparatus; and a restart unit configured to restart the periodic obtaining of the counter information by the obtain unit that was halted by the halt unit in response to completion notification of processing based on the print job in the image forming apparatus, wherein the update unit updates the counter information managed in the database using the notification of the processing status of the print job obtained from the image forming apparatus while the periodic obtaining of the counter information is halted by the halt unit.

The present invention in its second aspect provides a print control method that is carried out in a print control apparatus that is connected to an image forming apparatus via a network, has a database configured to manage counter information, and receives a processing status of a print job in the image forming apparatus, the method comprising the steps of: obtaining counter information periodically from the image forming apparatus, halting the periodic obtaining of the counter information in the obtaining step in response to start notification of processing based on a print job in the image forming apparatus, restarting the periodic obtaining of the counter information by the obtaining step that was halted by the halting step in response to completion notification of processing based on the print job in the image forming apparatus, and updating the database based on the counter information obtained in the obtaining step while the periodic obtaining of the counter information is not halted by the halting step, and updating the counter information managed in the database using the notification of the processing status of the print job obtained from the image forming apparatus while the periodic obtaining of the counter information is halted by the halting step.

The present invention in its third aspect provides a computer-readable medium storing a print control program that is connected to an image forming apparatus via a network for receiving notification of a processing status of a print job in the image forming apparatus, the program causing a computer to execute functions of: obtaining periodically counter information from the image forming apparatus, updating a database that manages the counter information of the image forming apparatus based on the obtained counter information, halting the periodic obtaining of the counter information in response to start notification of processing based on a print job in the image forming apparatus, restarting the periodic obtaining of the counter information that was halted in response to completion notification of processing based on the print job in the image forming apparatus, and updating the counter information managed in the database using the notification of the processing status of the print job obtained from the image forming apparatus while the periodic obtaining of the counter information is halted.

The present invention in its fourth aspect provides a print control apparatus that is connected to an image forming apparatus via a network and that receives notification of a processing status of a print job in the image forming apparatus, the print control apparatus comprising: a database configured to manage information on a remaining amount of toner in the image forming apparatus, an obtain unit configured to periodically obtain the information on the remaining amount of toner from the image forming apparatus, an update unit configured to update the database based on the information on the remaining amount of toner obtained from the obtain unit, a halt unit configured to halt the periodic obtaining of information on the remaining amount of toner by the obtain unit in response to start notification of processing based on a print job in the image forming apparatus, and a restart unit configured to restart the periodic obtaining of the information on the remaining amount of toner by the obtain unit halted by the halt unit in response to completion notification of processing based on the print job in the image forming apparatus, wherein the update unit updates the information on the remaining amount of toner managed in the database using the notification of the processing status of the print job obtained from the image forming apparatus while the periodic obtaining of the information on the remaining amount of toner is halted by the halt unit.

The present invention in its fifth aspect provides a print control method carried out in a print control apparatus that is connected to an image forming apparatus via a network, has a database configured to manage information on a remaining amount of toner, and receives notification of a processing status of a print job in the image forming apparatus, the method comprising the steps of: obtaining periodically the information on a remaining amount of toner from the image forming apparatus, halting the periodic obtaining of the information on a remaining amount of toner by the obtaining step in the image forming apparatus in response to start notification of processing based on a print job, restarting the periodic obtaining of the information on a remaining amount of toner in the obtaining step halted in the halting step in response to completion notification of processing based on the print job in the image forming apparatus, and updating the database based on the information on a remaining amount of toner obtained in the obtaining step while the periodic obtaining of the information on a remaining amount of toner is not halted by the halting step, and updating the information on a remaining amount of toner managed in the database using the notification of the processing status of the print job obtained from the image forming apparatus while the periodic obtaining of the information on a remaining amount of toner is halted by the halting step.

The present invention in its sixth aspect provides a computer-readable medium storing a print control program that is connected to an image forming apparatus via a network for receiving notification of a processing status of a print job in the image forming apparatus, the program causing a computer to execute functions of: obtaining periodically information on a remaining amount of toner from the image forming apparatus, updating a database that manages the information on a remaining amount of toner in the image forming apparatus based on the obtained information on a remaining amount of toner, halting the periodic obtaining of the information on a remaining amount of toner in response to start notification of processing based on a print job in the image forming apparatus, restarting the halted periodic obtaining of the information on a remaining amount of toner in response to completion notification of processing based on the print job in the image forming apparatus, and updating the information on a remaining amount of toner managed in the database using the notification of the processing status of the print job obtained from the image forming apparatus while the periodic obtaining of the information on a remaining amount of toner is halted.

According to the present invention, MIB information of the print control apparatus can be updated flexibly without degrading the print performance of the image forming apparatus.

Further features of the present invention will become apparent from the following description of exemplary embodiments with reference to the attached drawings.

BRIEF DESCRIPTION OF THE DRAWINGS

FIGS. 8A to 8C are flowcharts illustrating a procedure of update processing of counter MIB in a print control apparatus in a first embodiment of the present invention.

FIG. 9 is a diagram illustrating an exemplary configuration of an event packet sent by the image forming apparatus after completion of one page.

DESCRIPTION OF THE EMBODIMENTS

Figure 1:
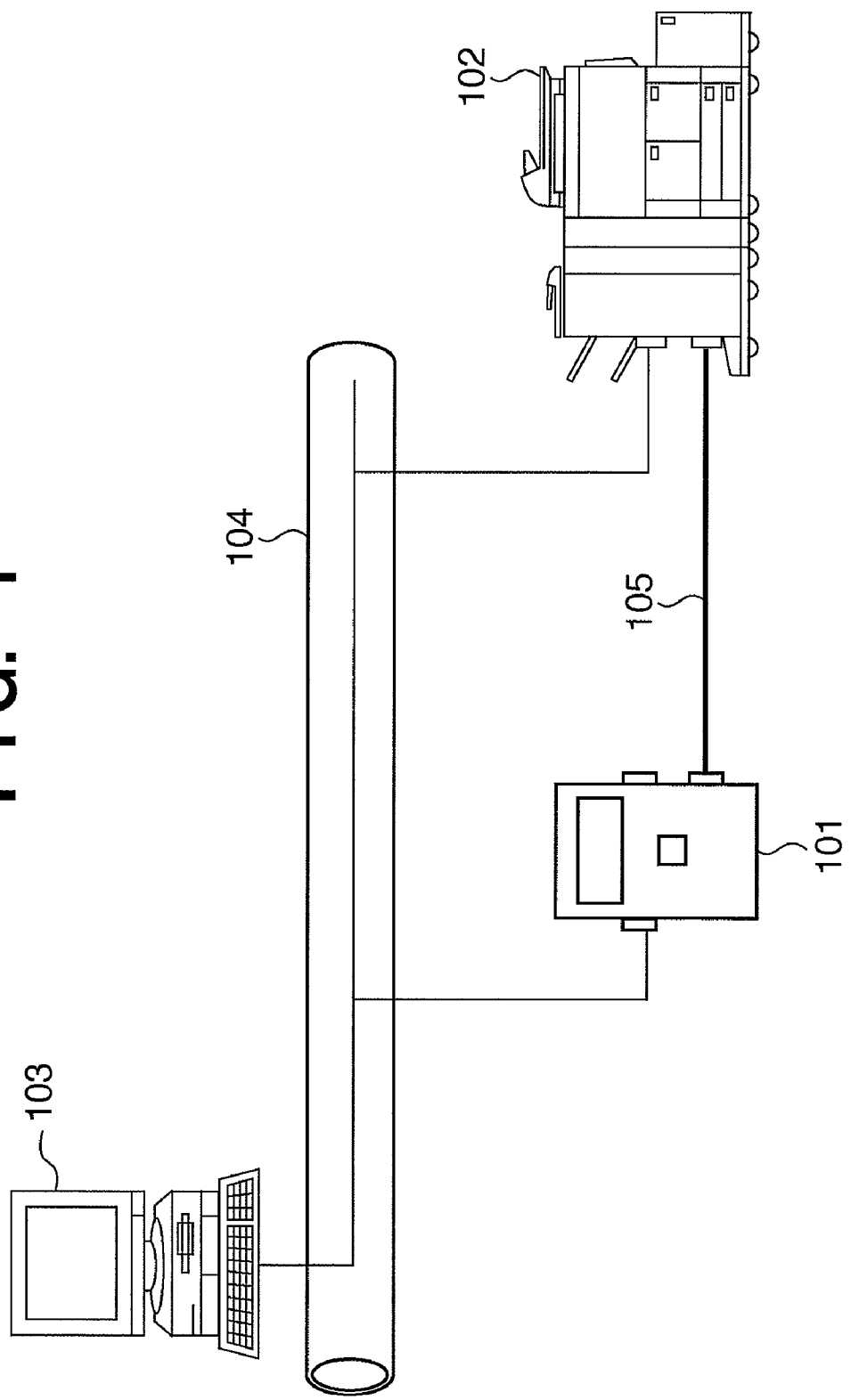
FIG. 1 is a diagram illustrating a configuration of a database synchronization system including a print control apparatus according to an embodiment of the present invention.

Hereinafter, preferred embodiments of the present invention will be described in detail with reference to the drawings. Note that the same reference numerals will be appended to the same constituent elements, and description thereof will be omitted.

FIG. 1 is a diagram illustrating a configuration of a database synchronization system including a print control apparatus according to an embodiment of the present invention. As shown in FIG. 1, this system includes a print control apparatus 101, an image forming apparatus 102, and a terminal apparatus 103. Those apparatuses are connected by, for example, a network 104, that is, LAN. The print control apparatus 101 and the image forming apparatus 102 are connected by a dedicated transmission path 105.

Figure 2:
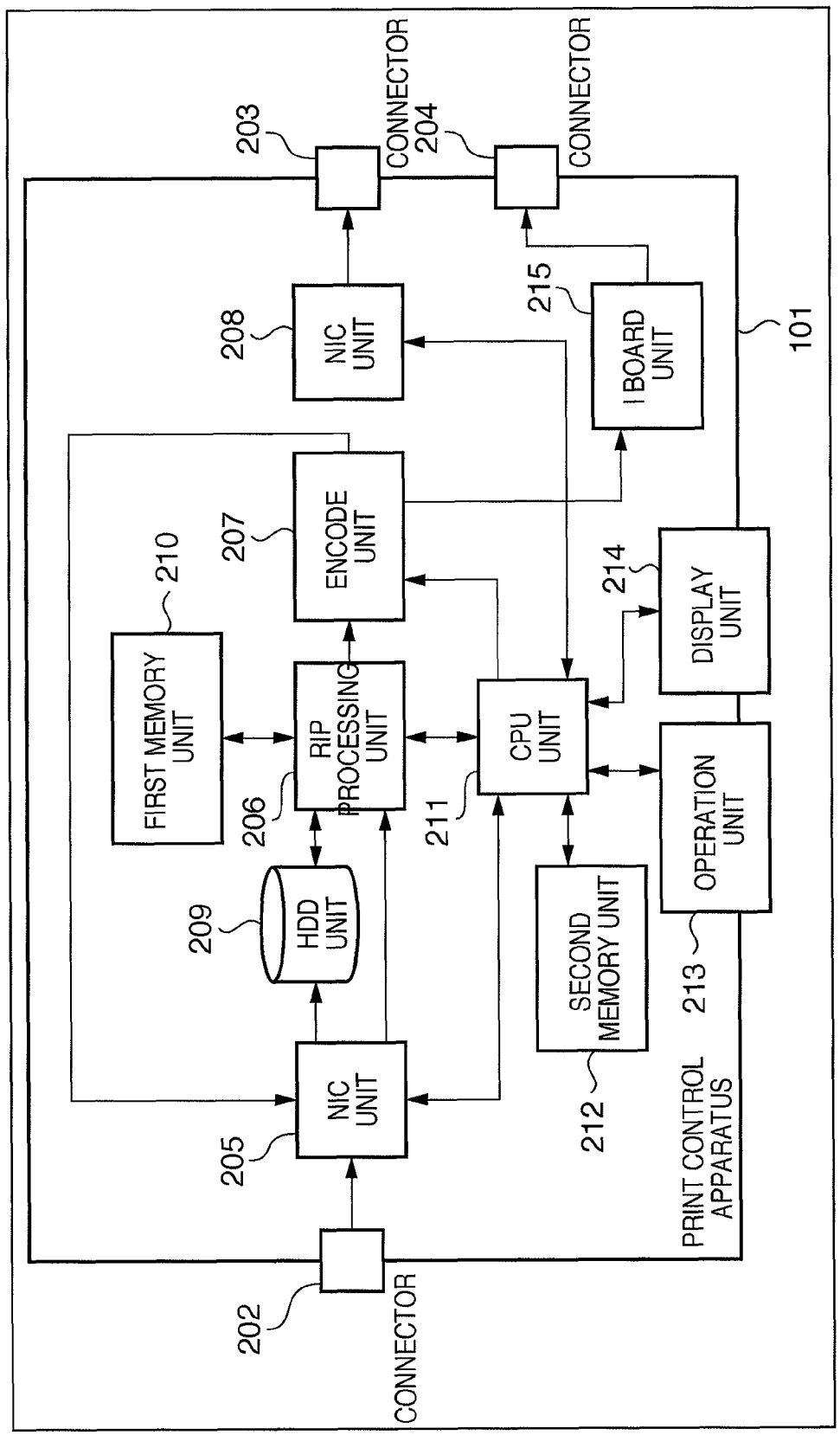
FIG. 2 is a block diagram illustrating an internal configuration of the print control apparatus shown in FIG. 1.

FIG. 2 is a block diagram illustrating an internal configuration of the print control apparatus 101 shown in FIG. 1. The print control apparatus 101 is connected to the network 104 via connectors 202 and 203 shown in FIG. 2. An NIC unit 205 is an NIC (Network Interface Card), as a first network interface that enables connection between the print control apparatus 101 and the network 104 at a lower layer. An RIP processing unit 206 rasterizes images received in a particular data format, for example, data in a print language such as PDL, or data compressed in JBIG. An encode unit 207 converts the rasterized image data to a print data format or a data format supported by the image forming apparatus 102. An NIC unit 208 is an NIC unit, as a second network interface that enables connection at a lower layer level. An HDD unit 209 is a hard disk drive that temporarily stores (spools) the print data received by the NIC unit 205 or compressed data after the RIP. A first memory unit 210 is used in image decompression processing of the RIP processing unit 206. A CPU 211 controls the overall print control apparatus. A second memory unit 212 is used as a storage region where the CPU 211 temporarily stores data. An operation unit 213 has buttons, keys, touch panels, and the like, and carries out operation of the print control apparatus 101. A display unit 214 conveys information to operators by images and texts. An I board unit 215 is an image interface board, and is connected to the dedicated transmission path 105 via the connector 204. The image data can be forwarded via the dedicated transmission path 105 through the I board unit 215 and the connector 204.

In the following, a data flow between the terminal apparatus 103, the print control apparatus 101, and the image forming apparatus 102 is described.

A data packet sent from the terminal apparatus 103 is transmitted to the print control apparatus 101 via the network 104. Receive processing is carried out in the NIC unit 205 of the print control apparatus 101 for the transmitted data packet. The data packet received in the NIC unit 205 is in conformity with TCP/IP protocol, and when TCP or UDP packet is used, the header information portion of the packet contains a destination port number. The destination port number is information indicating to which program or process the data should be sent in the apparatus that received the data packet. Thus, generally, a port number is uniquely given to each communication protocol and program. Examples of such numbering are as follows: FTP (File Transfer Protocol)=Port 21, SMTP (Simple Mail Transfer Protocol)=Port 25, and SNMP=Port 161. Thus, by checking the port number contained in the header of the received data packet and determining whether or not the port number corresponds to print processing, determination can be made as to whether the data packet is print data, control data, or other data. Therefore, in this embodiment, the NIC unit 205 can determine if the data packet is print data or control data based on the destination port number by extracting the destination port number from the header of the received data packet. When it is determined that the received data is print data, the received data is written in the HDD unit 209 by control of the CPU 211. This is commonly done by queuing (spool) for the purpose of, for example, improving the data transmission speed.

The data stored in the HDD unit 209 is read out by the RIP processing unit 206 on the request from the CPU 211. On the other hand, the print data to which the queuing was not carried out is forwarded directly to the RIP processing unit 206 on the request from the CPU 211. The print data sent to the RIP processing unit 206 goes through raster image processing in the RIP processing unit 206. Then, in the encode unit 207, the data is encoded to a data format that can be interpreted by the image forming apparatus 102 based on a preset data format that can be interpreted by the image forming apparatus 102 and a data format of the received data. The interpretable data format may also be obtained by allowing a user to communicate a value assigned by the operation unit 213 with the image forming apparatus 102. The encode processing is carried out as necessary, and therefore may be skipped if the encode processing is not necessary. The data format after the encode processing is the data format that can be interpreted by the image forming apparatus 102, and is different depending on the ability of an interpretation means contained in the image forming apparatus 102, for example, a specific print language format, and a data format compressed by a particular method such as JBIG. The data that went through the encode processing as necessary is made into a data packet again by the NIC unit 205, and sent out from the connector 202. The packet sent out is sent to the image forming apparatus 102 via the network 104.

The image forming apparatus 102 that received the data packet carries out print processing on a recording medium such as paper in accordance with print processing procedures of the image forming apparatus 102. In another data transmission method, the data may also be forwarded to the I board unit 215 from the encode unit 207 and sent to the image forming apparatus 102 via the connector, that is, via the connector 204 and the dedicated transmission path 105. When image data scanned at a reader unit 303 to be mentioned later is sent from the image forming apparatus 102 to the terminal apparatus 103, the data packet is sent out to the network 104 and sent to the terminal apparatus 103.

Figure 3:
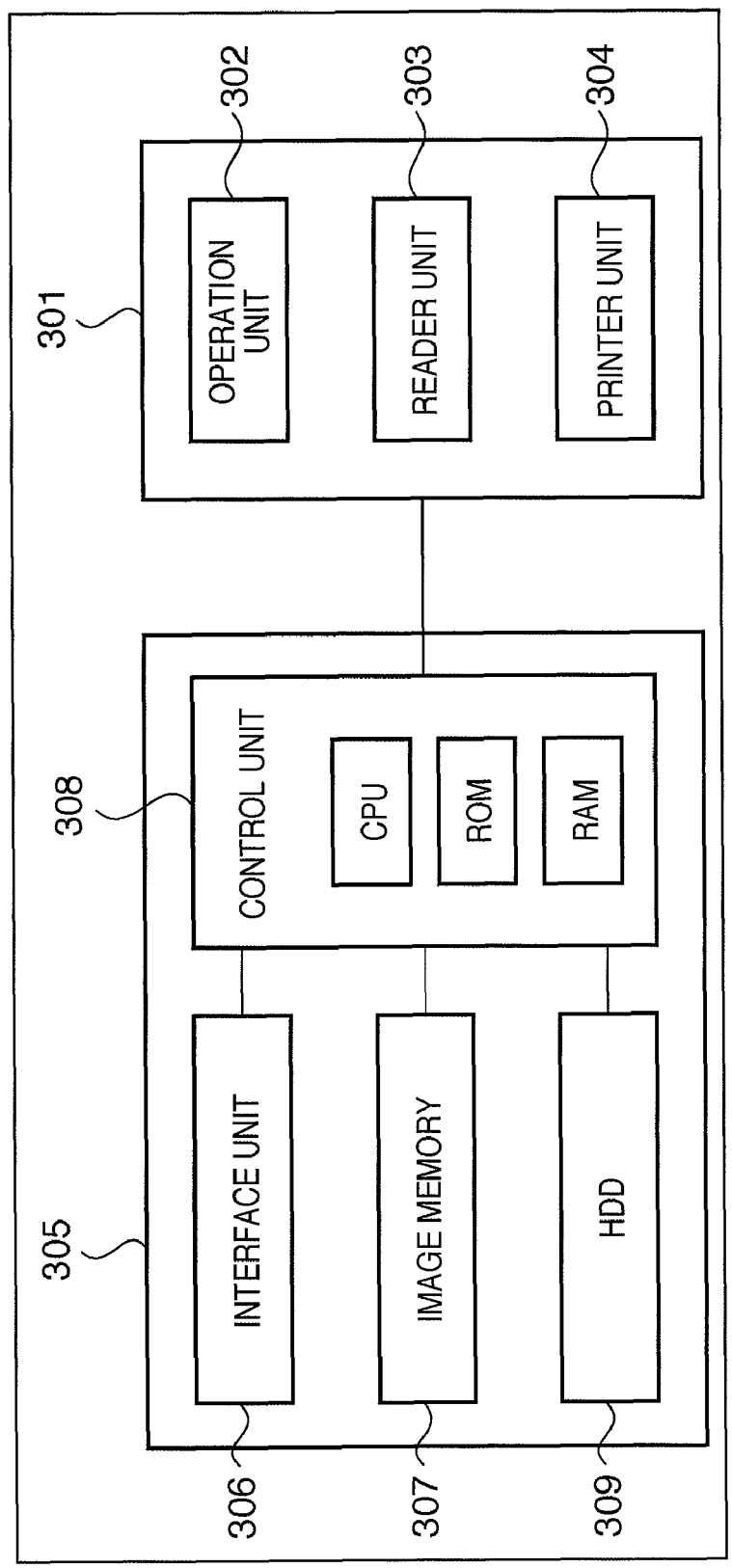
FIG. 3 is a block diagram illustrating a configuration of an image forming apparatus.

FIG. 3 is a block diagram illustrating a configuration of the image forming apparatus 102. As shown in FIG. 3, the image forming apparatus 102 includes a main body 301 and an image input/output control unit 305. The main body 301 includes an operation unit 302, a reader unit 303, and a printer unit 304. The operation unit 302 is used when operating the main body 301 and the image input/output control unit 305. The reader unit 303 reads the image of a document, and outputs image data in accordance with the document image to the printer unit 304 and the image input/output control unit 305. The printer unit 304 records images on a recording paper according to the image data received from the reader unit 303 and the image input/output control unit 305.

The image input/output control unit 305 is connected to the reader unit 303, and includes an interface unit 306, an image memory 307, a control unit 308, and an HDD 309. The HDD 309 is a hard disc that stores setting data of the image forming apparatus 102, for example, address books, operation history, user setting, ID setting, network setting, and the like. The interface unit 306 is an interface between the print control apparatus 101 and the control unit 308 of the image forming apparatus 102. The interface unit 306 decompresses code data indicating images forwarded from the print control apparatus 101 to image data that can be recorded by the printer unit 304, and outputs the data to the control unit 308. The interface unit 306 is a network interface such as Ethernet®, and may be configured to be connected via the print control apparatus 101 and the network. A configuration can also be made so as to make a direct connection to the print control apparatus 101 via the interface cable using a parallel interface, a USB interface, and the like. In such a case, a single cable or multiple cables may be used for the configuration. The control unit 308 includes a CPU, a ROM, and a RAM. The CPU in the control unit 308 loads a program stored in the ROM or in other storage medium on the RAM and executes the program, and controls data communication among the reader unit 303, the interface unit 306, and the image memory 307. Note that data can be stored in a configuration including a non-volatile memory instead of the HDD 309 in FIG. 3.

Figure 4:
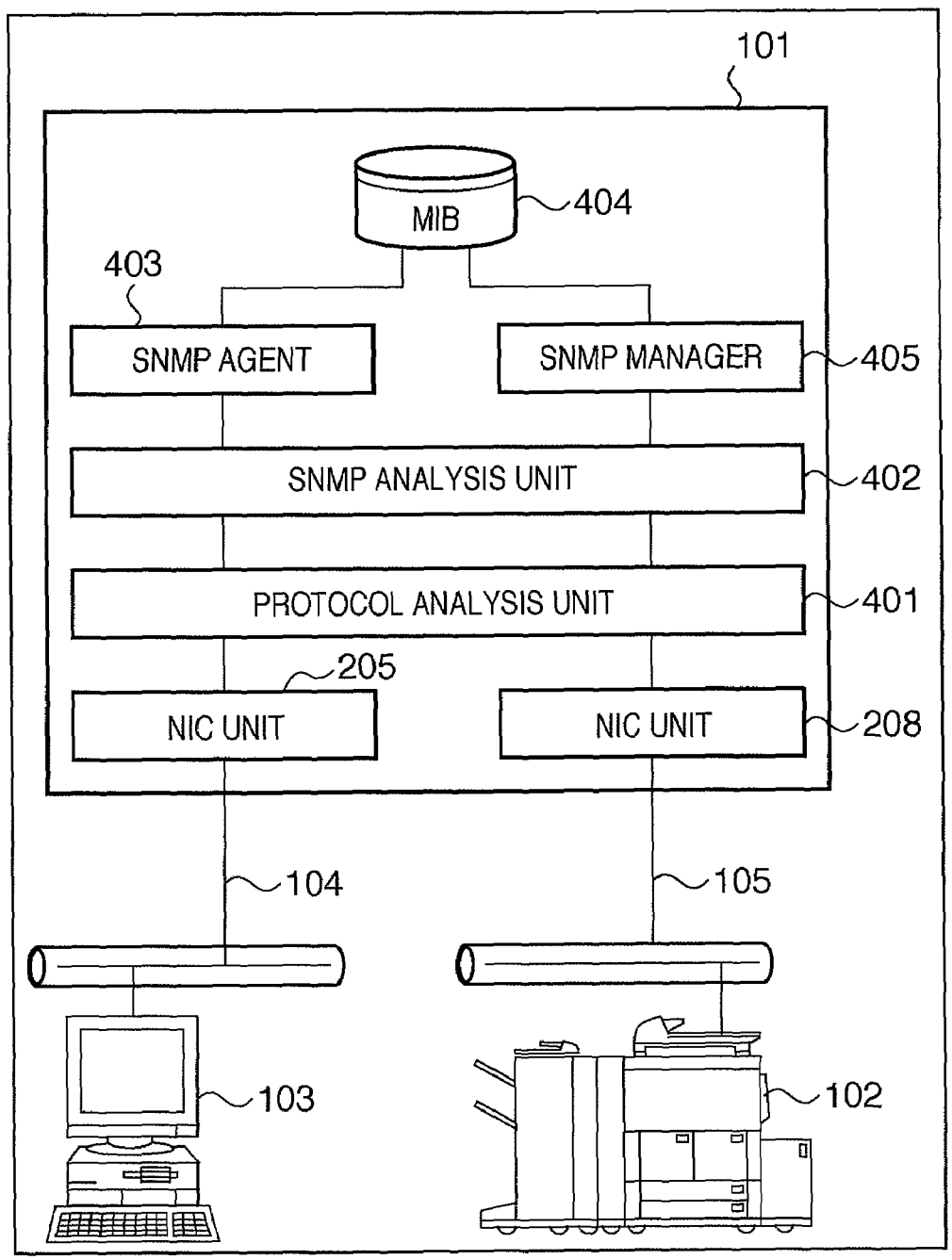
FIG. 4 is a diagram illustrating a configuration of a module relating to SNMP in the print control apparatus.

In the following, a flow of SNMP communication between the print control apparatus 101 and the image forming apparatus 102 is described with reference to FIG. 4 and FIG. 5. FIG. 4 is a diagram illustrating a configuration of a module relating to SNMP in the print control apparatus. The print control apparatus 101 includes functions of an SNMP manager 405. The SNMP manager 405 can produce an SNMP packet and obtain values of MIB objects held by the image forming apparatus 102. The SNMP manager 405 can also change data held by the image forming apparatus 102. The packet produced by the SNMP manager 405 is sent to an SNMP analysis unit 402, and the data is processed so that the SNMP data is forwarded to the network. The processed SNMP data is sent to a protocol analysis unit 401, and after an SNMP packet header is added, the data is sent to an NIC unit 208, and sent to the image forming apparatus 102 via the dedicated transmission path 105.

Figure 5:
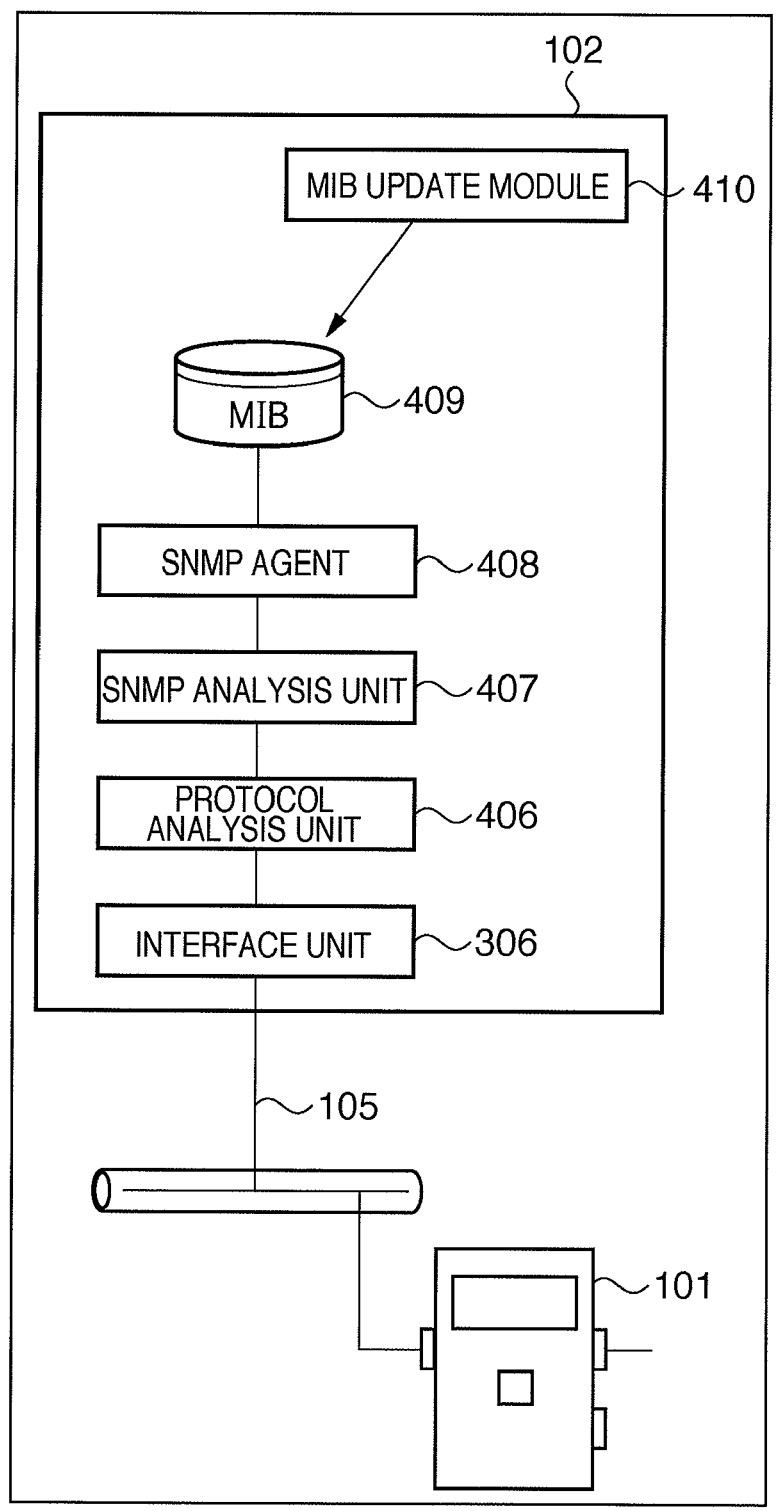
FIG. 5 is a diagram illustrating a configuration of a module relating to SNMP in the image forming apparatus.

FIG. 5 is a diagram illustrating a configuration of a module relating to SNMP in the image forming apparatus. The SNMP packet sent as described with reference to FIG. 4 is received by the interface unit 306 of the image forming apparatus 102 shown in FIG. 5. The received SNMP packet is sent to a protocol analysis unit 406. In the protocol analysis unit 406, the received SNMP packet data is analyzed, and only the SNMP protocol is extracted and then sent to an SNMP analysis unit 407. The protocol analysis unit 406 also handles various data such as communication control data other than SNMP data, file access data, print data, and the like, and can analyze protocols according to various data. Data is forwarded to an appropriate module as a result of such analysis, but detailed descriptions of such processing are omitted. The SNMP analysis unit 407 analyses the SNMP packet extracted in the protocol analysis unit 406, and MIB data written in ASN.1 and stored in the packet data is analyzed into a format that can be internally processed. The analyzed MIB data is sent to the SNMP agent 408.

Object names of MIB are namespaces of objects managed by ISO and CCITT. An MIB 409 is a database in which a variety of information on the image forming apparatus 102 is stored, and an MIB update module 410 stores various values of the image forming apparatus 102 in the MIB 409. Analyzing the SNMP packet, the SNMP agent 408 carries out a requested operation to the target data stored in the MIB 409. For example, when the requested operation is to obtain values, the SNMP agent 408 obtains requested MIB object values from the MIB 409, and creates return data. When the requested operation is to set values, the SNMP agent 408 updates values of the MIB 409, and creates return data of a return value indicating success or failure of the update processing.

The SNMP agent 408 sends the created return data to the SNMP analysis unit 407. In the SNMP analysis unit 407, the created return data is converted to a data format that can be sent by SNMP, and is sent to the protocol analysis unit 406. In the protocol analysis unit 406, a packet header that can be sent to the network is added, and the data is sequentially sent to the interface unit 306. Afterwards, the data is returned to the print control apparatus 101.

The network packet received at the NIC unit 208 of the print control apparatus 101 goes through the protocol analysis unit 401 and the SNMP analysis unit 402, and then is received by the SNMP manager 405. Data obtained from the packet received is processed according to the operation requested from the SNMP manager 405. For example, when the requested operation is to obtain values, it is determined whether or not the obtaining was successful or a failure, and when it is determined that the operation was successful, the data is stored in the MIB 404 of the print control apparatus 101. As a result, MIB data of the image forming apparatus 102 and MIB data of the print control apparatus 101 can be synchronized. When the requested operation is to set values, it is determined whether or not the setting was successful. Note that there may be a case where other modules in the print control apparatus 101 obtain MIB data in the image forming apparatus 102, for the purpose other than synchronization of the MIB data. However, descriptions thereof are omitted in this embodiment.

The terminal apparatus 103 sends a SNMP packet to the print control apparatus 101 when obtaining values stored in the MIB of the print control apparatus 101. Upon reaching the NIC unit 205 of the print control apparatus 101, the packet sent is sent to the SNMP agent 403 via the protocol analysis unit 401 and the SNMP analysis unit 402. The SNMP agent 403 analyzes the operation and MIB object requested by the terminal apparatus 103, operates the MIB 404, and carries out the requested operation. After the operation, a SNMP sending data is created. The created sending data is returned to the terminal apparatus 103 from the NIC unit 205 via the SNMP analysis unit 402 and the protocol analysis unit 401.

Figure 6:
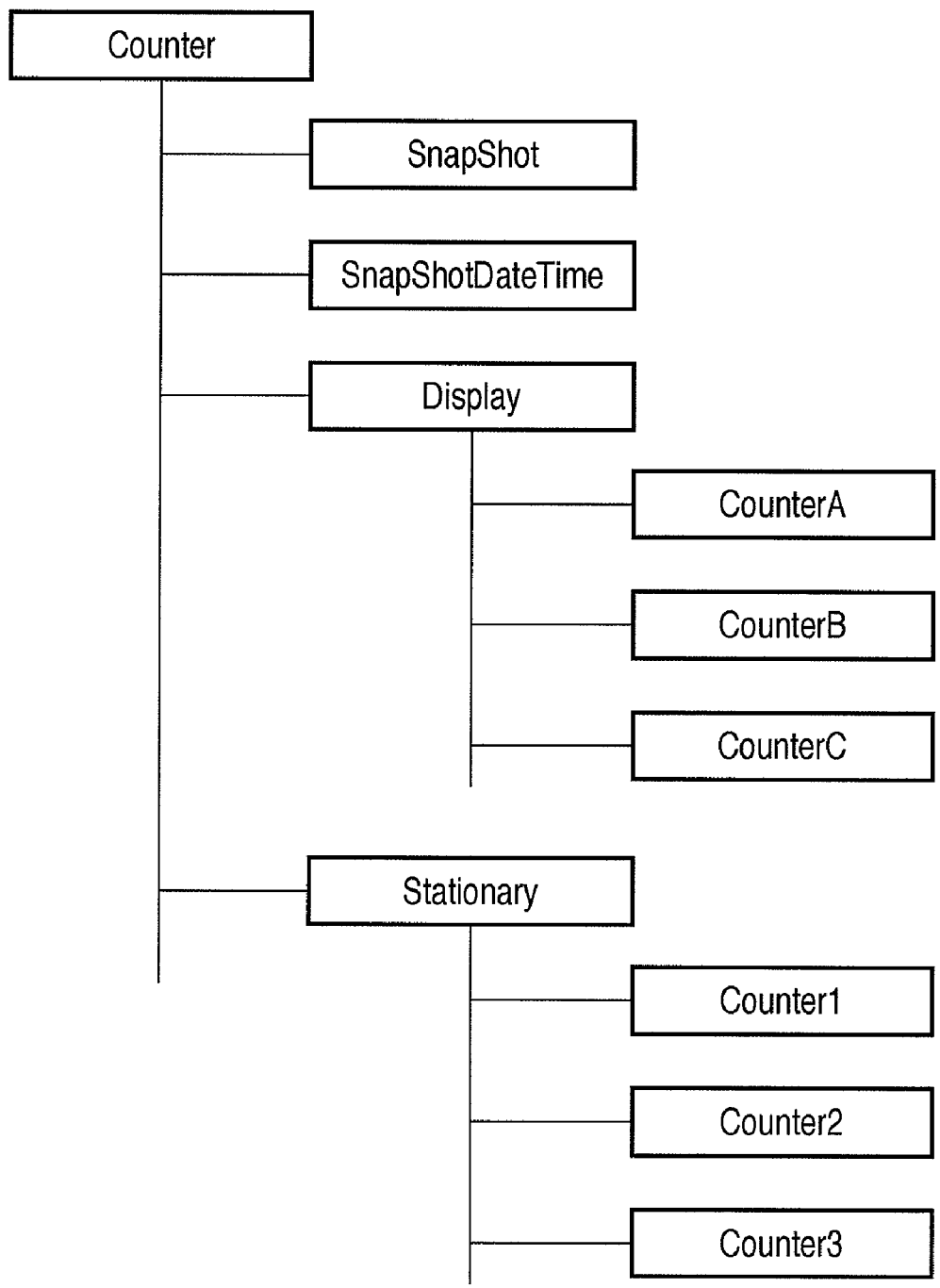
FIG. 6 is a diagram illustrating a summary of a table of objects in counter MIB.

FIG. 6 is a diagram illustrating summary of a table of objects in the MIB that hold counter information (in the following, also referred to as counter MIB). In this embodiment, the MIB objects include the MIB objects storing counter information on the inside the image forming apparatus (in the following, also referred to as a counter MIB object). Each counter MIB object is defined as, for example, type and size of the paper used, simplex/duplex, black and white, color, and the like, and therefore the image forming apparatus can store currently held counter information in each object defined. By obtaining such MIB objects, the print control apparatus serving as the manager can check a usage status of the image forming apparatus, and can charge money and carry out print control.

Two modes of the counter MIB are available according to the user's usage method. One is a mode in which the setting is "SnapShot=OFF". In this mode, each counter information is constantly changing. Therefore, when a counter in the image forming apparatus 102 is changed, the value in the counter MIB reflects the change. This mode is used when obtaining only specific information, for example, a black/white counter, although the consistency between the counter information is not guaranteed by the update timing or the obtain timing.

In the other mode, the setting is "SnapShot=ON". In this mode, the MIB information of each counter is fixed when the "SnapShot=ON" setting is made. All the counter information held by the image forming apparatus 102 at the time when the manager made the "SnapShot=ON" setting is written in the counter MIB. In this case, the setting will not be changed unless the mode is changed again to the "SnapShot=OFF" setting. This mode is used, for example, when all the counter MIB information is to be obtained once at the end of a day, because the consistency between values of the counter information is maintained.

The values to be set in the counter MIB objects held in the print control apparatus 101 are the values held by the image forming apparatus 102, and therefore it is necessary that the values are obtained from the image forming apparatus 102 and set as is to the print control apparatus 101. However, the timing of updating the counter MIB in the image forming apparatus 102 differs depending on the modes of "SnapShot". As already described, when the setting is "SnapShot=OFF", the update is carried out dynamically, and therefore it is necessary that the print control apparatus 101 constantly collects the counter MIB information of the image forming apparatus 102. In this case, it is necessary that the print control apparatus 101 carries out periodic communication by polling the image forming apparatus 102 at a constant interval, to carry out synchronization of the counter MIB.

The counter MIB indicated as "Counter" in FIG. 6 includes four objects, that is, "SnapShot", "SnapShotDateTime", "Display", and "Stationary".

Each object is described in the following. The "SnapShot" is an object that designates the updating method of the counter MIB. In this embodiment, the SNMP manager can set (Set) "valid" or "invalid" as values of the "SnapShot". When the SNMP manager sets "Valid" for the "SnapShot", the image forming apparatus 102 sets the values relating to the counter information held to the "Display" and the "Stationary".

The "Display" and the "Stationary" are objects in which counter information held by the image forming apparatus 102 is stored. Under the "Display", a user makes selections from various counter objects held by the image forming apparatus 102 to create MIB objects. That is, like "CounterA" to "CounterC" shown in FIG. 6, only the counter MIB objects selected by the user are placed as objects under the "Display". Under the "Stationary", the image forming apparatus 102 makes selections from counter objects held by the image forming apparatus 102 to create MIB objects. That is, like "Counter1" to "Counter3" shown in FIG. 6, the MIB objects that are regularly set are placed under the "Stationary".

The values set under the "SnapShot" are described again. When the "SnapShot" is set to "valid", the values at the time of such setting are kept, and the values of the "Display" and the "Stationary" are not updated unless the value of the "SnapShot" is updated. On the other hand, when the SNMP manager sets "SnapShot" to "invalid", the image forming apparatus 102 updates the values of the "Display" and the "Stationary" when the values relating to counter information of the image forming apparatus 102 itself are changed. That is, when the "SnapShot" is set to "invalid", the counter MIB shown in FIG. 6 is updated dynamically. The SNMP manager can also obtain (Get) the value of the "SnapShot".

"SnapShotDateTime" is an object in which the time when the SNMP manager set the "SnapShot" to "valid" is stored. The value of the "SnapShotDateTime" is set by the image forming apparatus 102, and therefore the SNMP manager can obtain (Get) but cannot set (Set) the value.

Figure 7:
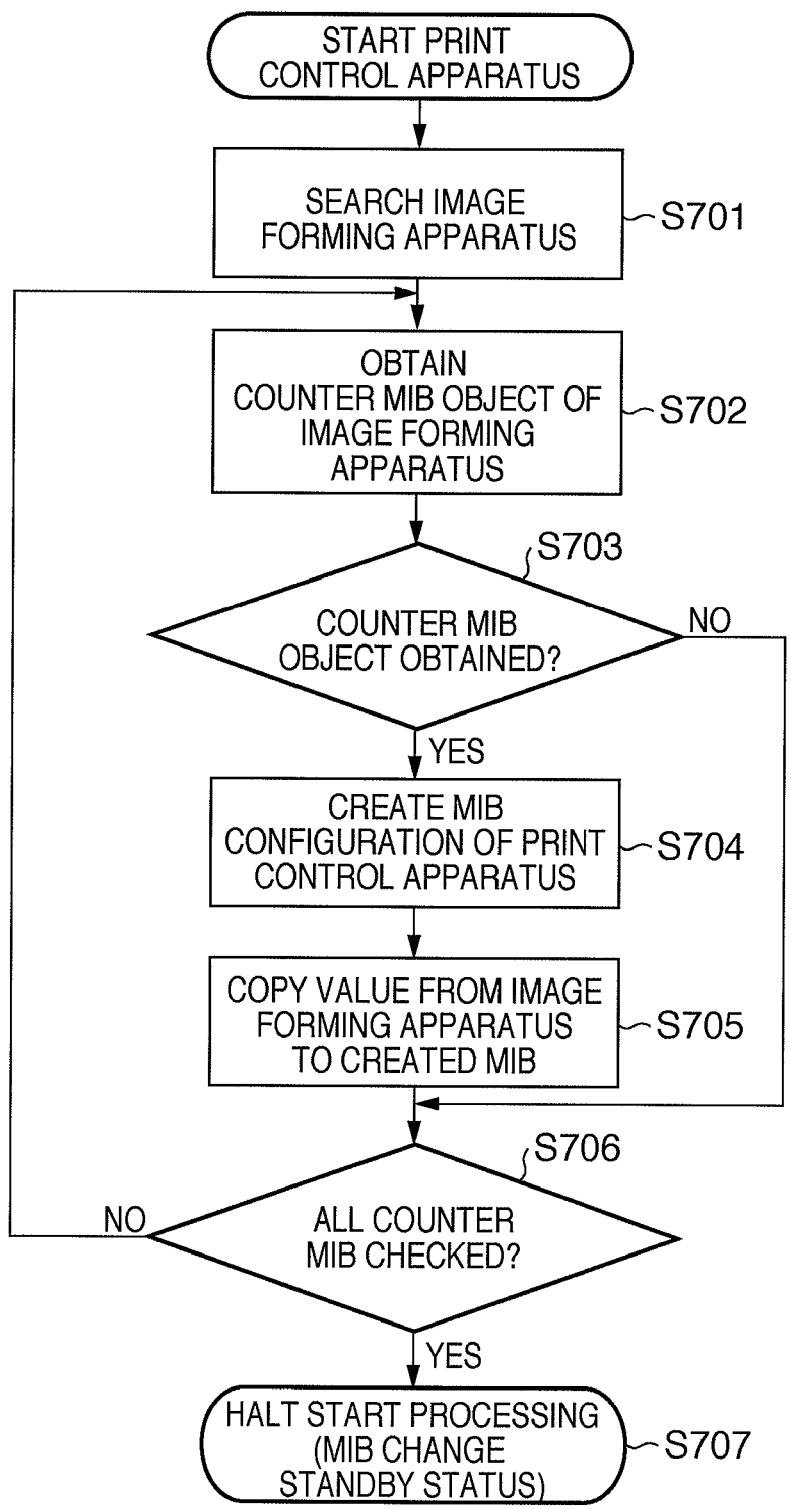
FIG. 7 is a flowchart illustrating a procedure of start processing in a print control apparatus in an embodiment of the present invention.

In the following, start processing of the print control apparatus 101 in this embodiment is described. FIG. 7 is a flowchart illustrating procedures of start processing of the print control apparatus in this embodiment. First, the print control apparatus 101 is started, and the image forming apparatus 102 connected to the print control apparatus 101 is searched for in step S701. The searching of the image forming apparatus 102 is carried out, for example, by using Ping, an original protocol, SNMP, or the like, singly or in combination. When the image forming apparatus 102 is found, the process moves to step S702, and the values of the objects of the counter MIB are obtained from the image forming apparatus 102. For example, the values of the objects are obtained from the image forming apparatus using Get operation (GetRequest, GetNextRequest, and the like) of SNMP protocol. Next, in step S703, it is determined whether or not the values of the objects of the counter MIB are obtained properly. When it is determined that the values are obtained, the process moves to step S704. On the other hand, when it is determined that the values are not obtained from the image forming apparatus 102 in step S703, the process moves to step S706. The determination in step S703 may be made based on, for example, whether or not the Get operation was a success or failure. In step S704, MIB objects that are the same as the MIB objects obtained from the image forming apparatus 102 are created in the print control apparatus 101. In step S705, the values obtained from the image forming apparatus 102 in step S702 are set as the values of the MIB objects created in the print control apparatus 101 in step S704. Next, in step S706, it is determined whether or not all the processing is completed for the counter MIB objects that are necessary to be created in the print control apparatus 101. When it is determined that all the MIB objects are created, the process moves to step S707. On the other hand, when it is determined that all the MIB objects are not created, a next object is designated, and the process returns to S702. That is, by repeating steps S702 to S705, all the MIB objects configured in the image forming apparatus 102 are created in the print control apparatus 101. When all the MIB objects of the image forming apparatus 102 are created in the print control apparatus 101, the process moves to step S707, halting this start processing and standing by for a change in the counter MIB of the print control apparatus 101.

By the procedures shown in this flowchart, all the MIB objects of the image forming apparatus 102 are created in the print control apparatus 101, and a status for updating (update) the MIB in this embodiment is achieved. For example, when the value of the "SnapShot" MIB object obtained from the image forming apparatus 102 is "valid", the "SnapShot" in the print control apparatus 101 is set to "valid". Furthermore, in such a case, the time information when the "SnapShot" of the image forming apparatus 102 is set to "Valid" is set to the "SnapShotDataTime". On the other hand, when the value obtained from the image forming apparatus 102 is "invalid", the "SnapShot" of the print control apparatus 101 is set to "invalid".

Figure 8A:
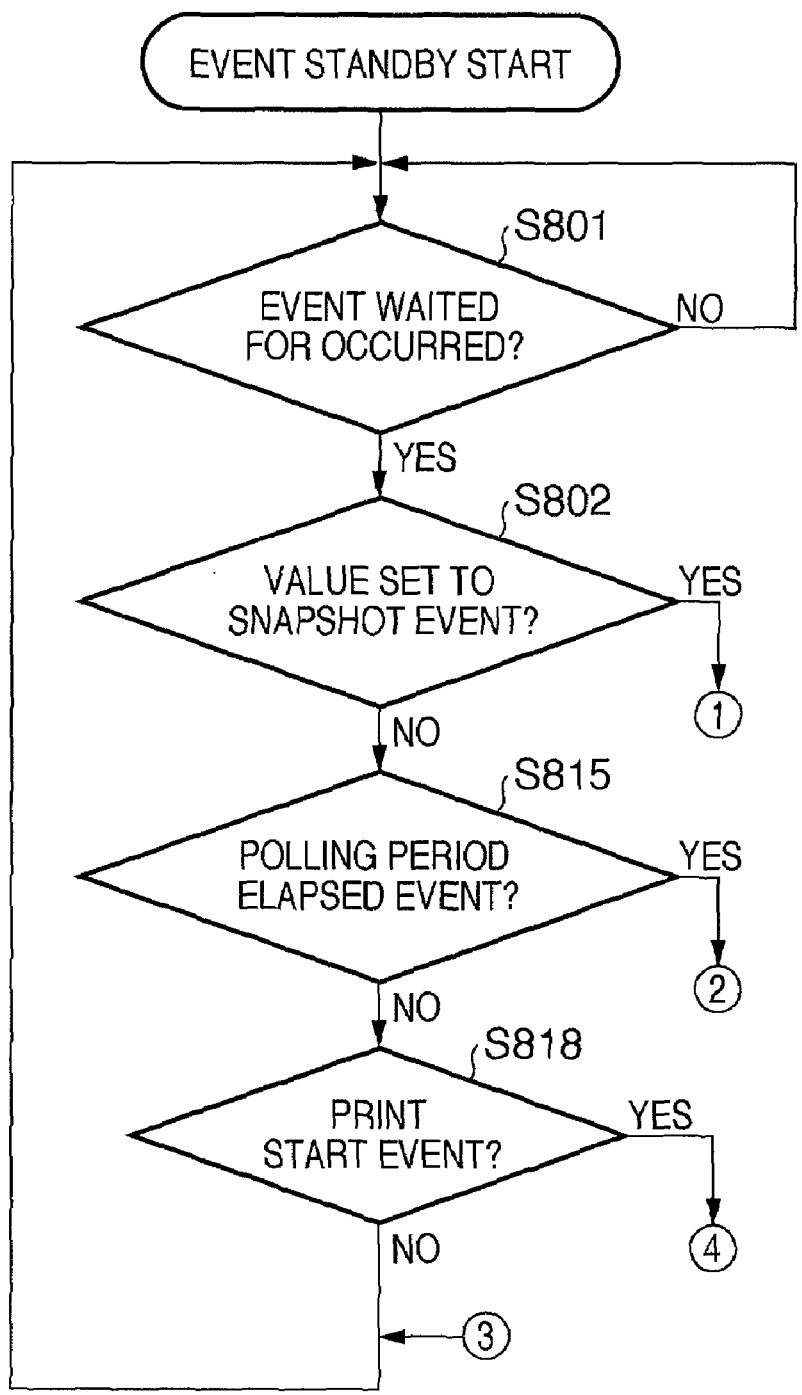
Figure 8C:
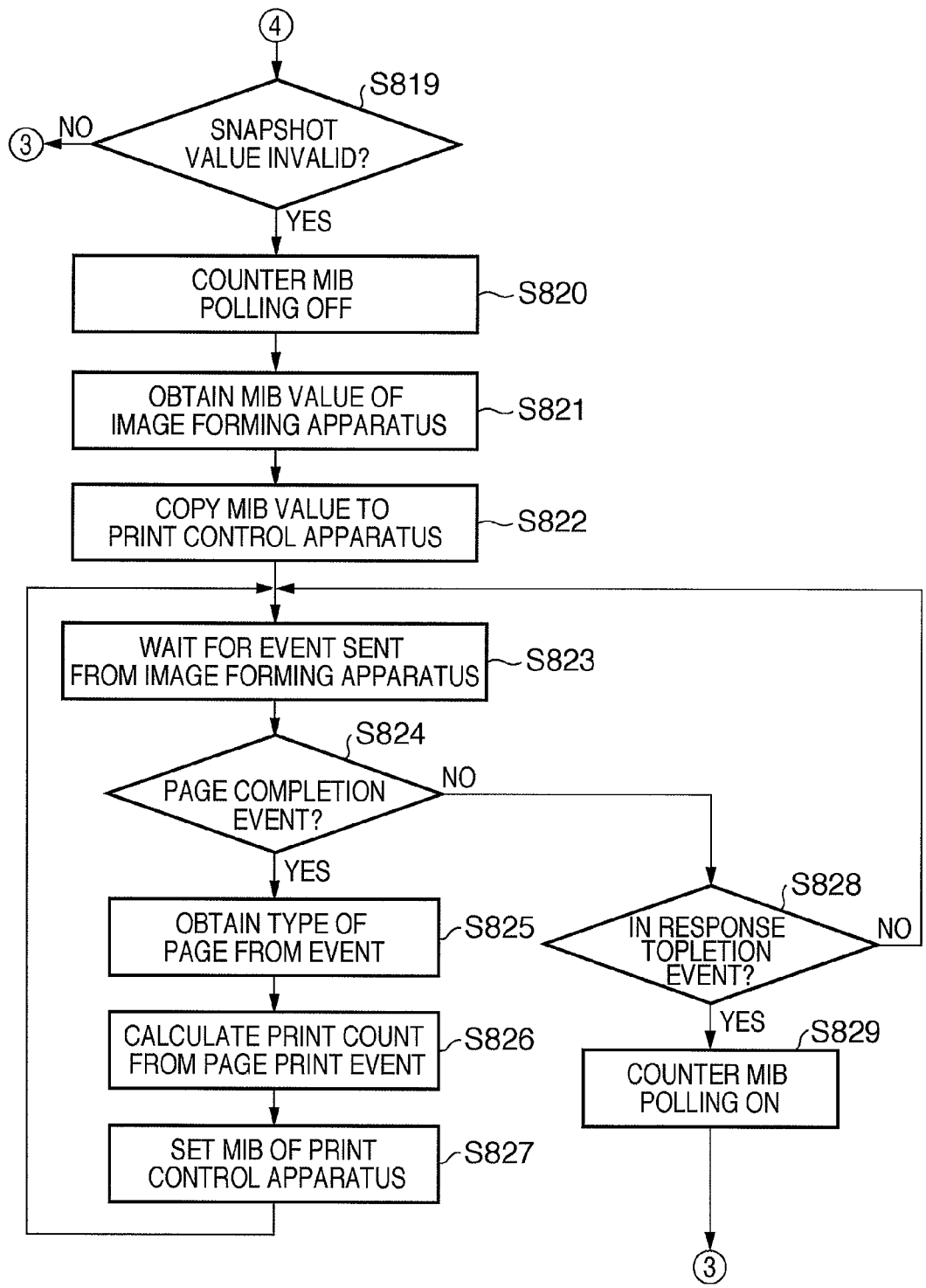

Next, a method of updating the counter MIB of the print control apparatus 101 in this embodiment is described. FIGS. 8A to 8C are flowcharts illustrating procedures for update processing of counter MIB in the print control apparatus in this embodiment. When the start processing of the print control apparatus 101 shown in FIG. 7 is completed, and a standby status for event occurrence begins, it is determined whether or not an event that triggers update of the counter MIB of the print control apparatus 101 occurred in step S801. In this embodiment, those events to be waited for are, an event in which a value is set to the "SnapShot" of the print control apparatus 101, an event indicating whether or not the polling period has elapsed or not, or an event indicating that a print job has been requested. When any of these events occurs, the process moves to step S802. Unless an event that is being waited for occurrence occurs, the standby status will be maintained in step S801.

In step S802, it is determined whether or not the event in which a value is set to the "SnapShot" occurred. When it is determined that the event occurred was the event in which a value is set to the "SnapShot", the process moves to step S803. On the other hand, when it is determined that the event did not occur, the process moves to step S815. In step S803, it is determined that the value set to the "SnapShot" of the print control apparatus 101 is "Valid" or "Invalid". When the value set is "invalid", the process moves to step S804. In step S804, counter MIB polling is set to ON. By setting the counter MIB polling to ON, the print control apparatus 101 obtains the counter MIB of the image forming apparatus 102 at a predetermined interval. In such a case, the interval for obtaining the counter MIB may be set in the print control apparatus 101 in advance, or a user may set the interval at a user interface of the print control apparatus 101 or the image forming apparatus 102. The polling interval may also be set in another MIB object in the print control apparatus 101. In step S804, after setting the counter MIB polling to ON, the process moves to step S805, and the print control apparatus 101 sets the "SnapShot" of the image forming apparatus 102 to "invalid". In step S805, although "invalid" is set to the image forming apparatus 102, the setting may be made to "valid" every time when carrying out the counter MIB polling, and the values of the image forming apparatus 102 is updated. When "invalid" is set to the image forming apparatus 102 in step S805, the process moves to step S806. In step S806, the print control apparatus 101 obtains (Get) all the counter MIB values of the image forming apparatus 102. When the values are successfully obtained, the process moves to step S807, and the values of each counter MIB object obtained (Get) from the image forming apparatus 102 are set to the values of corresponding MIB objects in the print control apparatus 101 in step S806. For example, the value of "CounterA" in the image forming apparatus 102 shown in FIG. 6 is set to the value of "CounterA" of the print control apparatus 101. When the value setting is completed, the process returns to the standby status in step S801 and waits for a next event.

Step S803 is described again. When the value set (Set) to the "SnapShot" in the MIB object of the print control apparatus 101 is "valid", the process moves to step S808. When the "SnapShot" of the print control apparatus 101 is set (Set) to "valid", it is not necessary that the counter MIB is constantly synchronized by polling, and therefore the counter MIB polling is set to OFF in step S808, and the process moves to step S809.

In step S809, the print control apparatus 101 obtains (Get) the "SnapShotDateTime" of the image forming apparatus 102, and stores the value. When the obtaining operation (Get) is successful, the process moves to step S810, and the print control apparatus 101 sets (Set) the "SnapShot" of the image forming apparatus 102 to "valid". When the setting operation (Set) is successful, the process moves to step S811. In step S811, the print control apparatus 101 obtains (Get) the "SnapShotDateTime" of the image forming apparatus 102 again. When the value is properly obtained, the value is stored separately from the value obtained in step S809. When the saving is completed, the process moves to step S812, and it is determined whether or not the value of the "SnapShotDateTime" is updated. In this embodiment, the determination in step S812 is made by comparing the values of the "SnapShotDateTime" obtained in step S809 and step S811, and determining if these values are the same or different. When it is determined that the values are different, it means that the counter MIB of the image forming apparatus 102 is updated, and the process moves to step S813. On the other hand, when it is determined that the values are the same, it means that the value of the MIB object of the image forming apparatus 102 is not updated, and therefore the process returns to step S810. In step S813, the print control apparatus 101 obtains (Get) the value of the counter MIB of the image forming apparatus 102, and the process moves to step S814. In step S814, the values of each counter MIB obtained (Get) from the image forming apparatus 102 are set to the values of corresponding MIB objects of the print control apparatus 101. For example, the value of "CounterA" in the image forming apparatus 102 shown in FIG. 6 is set to the value of "CounterA" of the print control apparatus 101. When the value setting is completed, the process returns to a standby status in step S801, and waits for a next event.

Based on the above-described procedures, the MIB of the print control apparatus 101 can be updated without carrying out the counter MIB polling when a client sets (Set) the "SnapShot" of the print control apparatus 101 to "Valid" from the terminal apparatus 103. As a result, because polling is not carried out when the counter MIB of the image forming apparatus 102 is updated statically, network loads between the print control apparatus 101 and the image forming apparatus 102 can be decreased.

Step S802 is described again. In step S802, when it is not determined that the event in which a value is set (Set) to "SnapShot" occurred, the process moves to step S815. In step S815, it is determined whether or not a predetermined period for polling for updates of the counter MIB has elapsed. When it is determined that the predetermined period has elapsed, the process moves to step S816. In step S816, the print control apparatus 101 obtains (Get) the value of the counter MIB of the image forming apparatus 102. When the print control apparatus 101 obtains the value of the counter MIB of the image forming apparatus 102, the process moves to step S816, and the values of each counter MIB obtained (Get) from the image forming apparatus in step S817 are set to the values of corresponding MIB object of the print control apparatus 101. For example, the value of "CounterA" in the MIB object of the image forming apparatus 102 shown in FIG. 6 is set to the value of "CounterA" in the print control apparatus 101. "Valid" may be set to the "SnapShot" of the MIB object in the image forming apparatus 102 before step S816. That is, the counter MIB of the image forming apparatus 102 may be updated statically, and the update of the counter MIB in the image forming apparatus 102 may be checked after carrying out steps S809 to S812. After the value setting of the MIB object of the print control apparatus 101 is completed, the process returns to a standby status in step S801, and waits for a next event.

Step S815 is described again. In step S815, when it is determined that the predetermined period for polling for updates of the counter MIB has not elapsed, the process moves to step S818. In step S818, it is determined whether or not the print control apparatus 101 is in a status for print start due to a print job requested from the terminal apparatus 103 and start notification of print processing. When it is determined that the print control apparatus 101 is in a status for print start, the process moves to step S819. On the other hand, when it is determined that the status is not for the print start, the process returns to a standby status in step S801, and waits for a next event.

The processing after step S819 is a flow for synchronization of the counter MIB when the print control apparatus 101 enters into a state for print start within a predetermined period for polling. Therefore, the processing is targeted for the case when the "SnapShot" in the MIB object of the print control apparatus 101 is set to "invalid". When the "Snapshot" value is "valid", there is no need for synchronization, and therefore the synchronization processing during print operation is unnecessary. That is, it is not necessary that the print control apparatus 101 carry out the synchronization processing with the image forming apparatus 102 when the "SnapShot" of the print control apparatus 101 is set (Set) to "valid" during the print operation. Thus, in step S819, when the "SnapShot" value of the print control apparatus 101 is "valid", the process returns to a standby status in step S801, and waits for a next event.

On the other hand, when the "SnapShot" value of the print control apparatus 101 is "invalid" in step S819, the process moves to step S820. In step S820, the counter MIB polling is set to OFF to halt the polling. Next, in step S821, the print control apparatus 101 obtains (Get) the values of the counter MIB in the image forming apparatus 102. When the values are successfully obtained, the process moves to step S822, and the values of each counter MIB obtained (Get) from the image forming apparatus 102 in step S821 are set to the values of corresponding MIB objects of the print control apparatus 101. For example, the value of "CounterA" of the image forming apparatus 102 shown in FIG. 6 is set to the value of "CounterA" of the print control apparatus 101. As shown in FIGS. 8A to 8C, synchronization with the counter MIB values of the image forming apparatus 102 is carried out once in steps S821 and S822. However, because the counter MIB of the image forming apparatus 102 is created in the print control apparatus 101 in the start processing shown in FIG. 7, steps S821 and S822 may be omitted. After the completion of the synchronization, the process moves to step S823.

In step S823, the print control apparatus 101 waits for an event packet sent from the image forming apparatus 102. When the print control apparatus 101 receives a print job sent from the terminal apparatus 103, the print control apparatus 101 carries out processing to convert the print job to a data format to be sent to the image forming apparatus 102, and sends the print job to the image forming apparatus 102. The print control apparatus 101 sets sending of an event to the image forming apparatus 102 to follow up and check if the print job sent from the print control apparatus 101 itself is properly processed. The print control apparatus 101 sets in advance in the image forming apparatus 102 events that involve notification and destinations of the event notification in order for the image forming apparatus 102 to notify the print control apparatus 101 of various events that will occur in job processing. In this embodiment, setting is made so as to notify the print control apparatus 101 of an event when the image forming apparatus 102 completed one job, and when a page is ejected during a job. In step S823, the print control apparatus 101 waits for an event packet (in the following, referred to as event) sent from the image forming apparatus 102. That is, an event packet also means a packet that indicates a processing status of a print job. The events are generally waited for by print tasks of the print control apparatus 101, and therefore are realized by obtaining by copying from a layer network, or data in events are obtained from print processing from the print control apparatus 101. When the print control apparatus 101 obtains an event sent from the image forming apparatus 102 in step S823, the process moves to step S824, and it is determined whether or not the event obtained was the event indicating completion of printing one page. When it is determined that the event was the event indicating completion of one page, the process moves to step S825. In step S825, information of the print result is obtained from the event packet.

In the following, a configuration of the event packet sent from the image forming apparatus 102 is described. FIG. 9 is a diagram illustrating an exemplary configuration of an event packet sent by the image forming apparatus after completing one page. As shown in FIG. 9, an event packet includes information of a job ID (print job ID), a total number of pages to be printed (total print page), and a number of pages that are already printed (printed page). Additionally, information of a print method (PDL/COPY, and the like), number of faces (number of imposed faces), total number of faces (total number of imposed faces), a color mode (black/white/color, and the like), a print size (for example, A4) is included. The values for each item shown in FIG. 9 can be freely set according to print processes.

FIGS. 8A to 8C are described again. When the information obtaining is completed in step S825, the process moves to step S826. In step S826, it is determined which value in the counter MIB of the print control apparatus 101 is to be updated based on information obtained from the event packet. When events shown in FIG. 9 are obtained, the counter MIB is updated by incrementing a total count, a black/white count, a large counter, a duplex total, and a PDL count. For example, when the number of printed pages in the event obtained is larger than the number of pages currently held in the print control apparatus 101, an amount incremented is determined. After calculating which counter MIB object is updated to which extent in such a fashion, the process moves to step S827. In step S827, the counter MIB values of the print control apparatus 101 are updated based on the results obtained in step S826. After updating all the counter MIB values, the process returns to step S823, and waits for a next event packet to be sent from the image forming apparatus 102.

On the other hand, when the event obtained in step S824 is not the event of completing one page, the process moves to step S828. In step S828, it is determined whether or not the event obtained was information indicating completion of the print job. When notification of processing completion of the print job is given based on the determination that it was the information indicating the completion of the print job, the process moves to step S829. In step S829, the counter MIB polling set to OFF in step S820 was set to ON again to restart the counter MIB polling, and the process returns to a standby status in step S801 and waits for a next event. In step S828, when it is determined that the event was not the print completion, the process returns to step S823, and waits for a next event packet to be sent from the image forming apparatus 102. In the flowcharts shown in FIGS. 8A to 8C, when an event that is waited for in step S801 occurred while the processing after step S802 being is carried out, the event may be stored for a moment. In such a case, the stored event is processed after the processing after step S802 is completed and the process returned to step S801.

As described above, in this embodiment, when a print job is thrown in while the print control apparatus 101 is carrying out periodic obtaining (polling) for the counter information to synchronize with the counter MIB of the image forming apparatus 102, the obtaining of the counter information is halted for a while. In such a case, the print control apparatus 101 updates the MIB object values of the print control apparatus 101 using the event information sent from the image forming apparatus 102. As a result, MIB information of the print control apparatus can be updated flexibly without degrading the print performance between the print control apparatus 101 and the image forming apparatus 102.

Figure 10A:
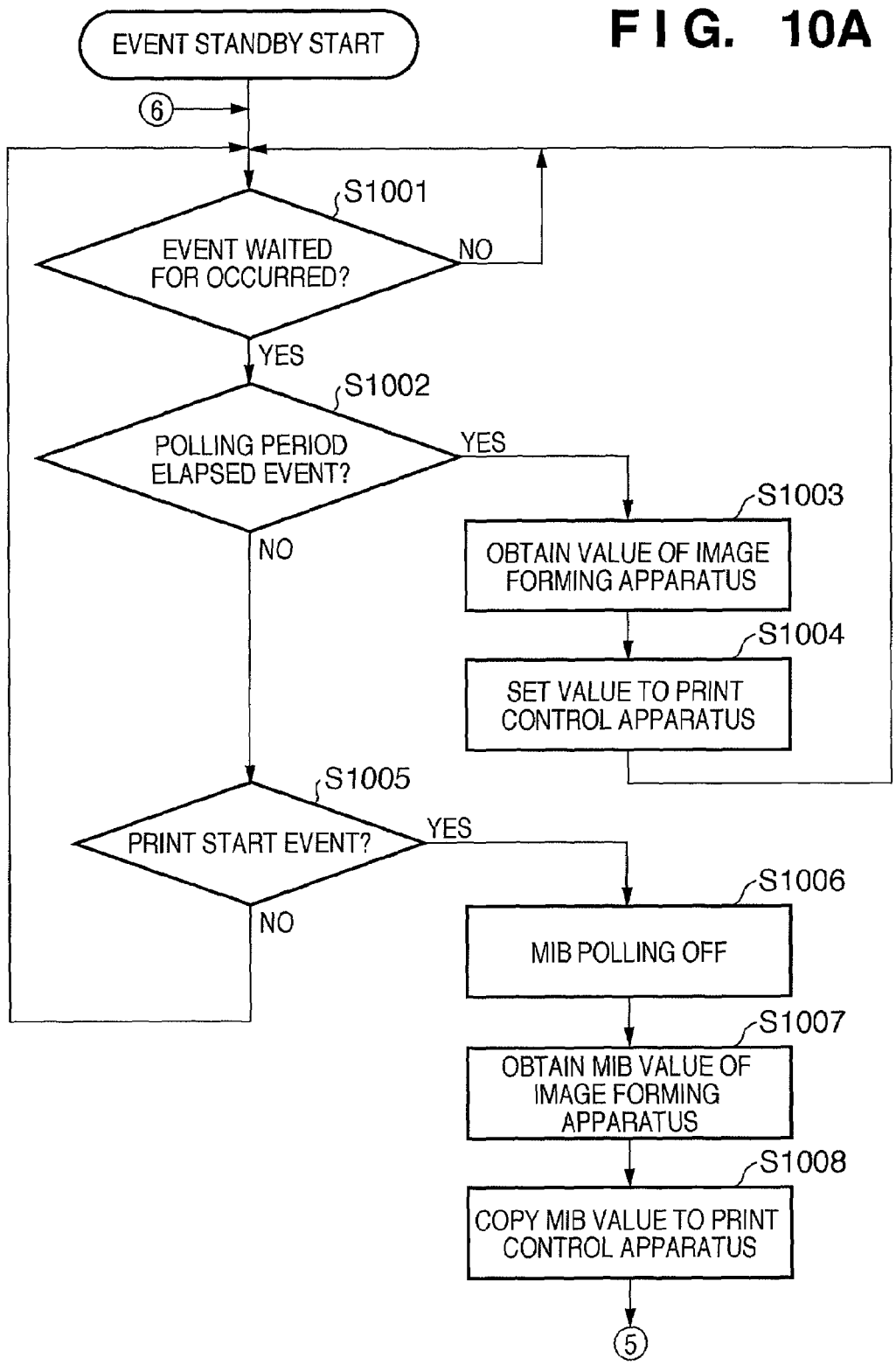
FIGS. 10A and 10B are flowcharts illustrating procedures of update processing of MIB in a print control apparatus in a second embodiment.
Figure 10B:
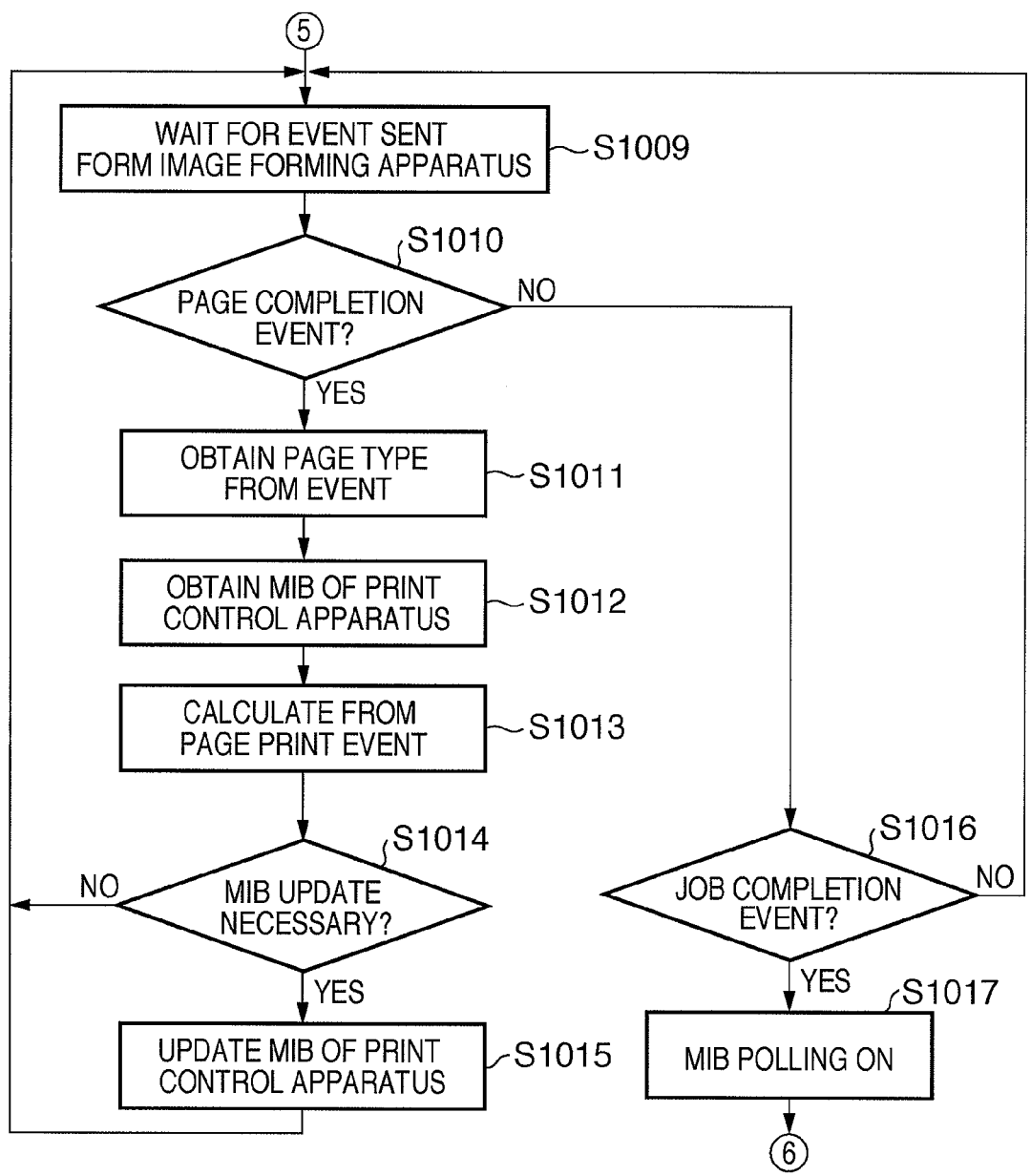

In the following, a method for updating MIB relating to consumption articles such as a remaining amount of toner, a remaining amount of paper, and the like of the print control apparatus 101 is described. FIGS. 10A and 10B are flowcharts illustrating procedures of update processing of MIB in the second embodiment. The remaining amount of toner is set in an object, "prtMarkerLifeCount", and the remaining amount of paper is set in an object, "PrtInputCurrentLevel". When the start processing shown in FIG. 7 is completed and a standby status begins, it is determined whether or not an event that triggers update of the MIB of the print control apparatus 101 occurred in step S1001. In this embodiment, those events whose occurrence is waited for are, an event indicating whether or not the polling period for the print control apparatus 101 has elapsed or not, or an event indicating that a print job has been requested. When any of these events occurred, the process moves to step S1002. Unless an event that is being waited for occurs, the standby status will be maintained in step S1001.

In step S1002, it is determined whether or not a predetermined period for polling for MIB synchronization has elapsed. When it is determined that the predetermined period has elapsed, the process moves to step S1003. In step S1003, the print control apparatus 101 obtains (Get) MIB values of the image forming apparatus 102. When the values are obtained, the process moves to step S1004, and the values of each MIB object obtained (Get) from the image forming apparatus 102 in step S1003 are set to the values of corresponding objects in the print control apparatus 101. For example, an MIB object, "PrtMarkerLifeCount.1.1" of the image forming apparatus 102 is set to an MIB object, "PrtMarkerLifeCount.1.1" of the print control apparatus 101. When the MIB value setting is completed, the process returns to step S1001 and waits for a next event.

When it is determined that the predetermined period for polling for MIB update has not elapsed in step S1002, the process moves to step S1005. It is determined whether or not the print control apparatus 101 is in print status by a print job thrown in from the terminal apparatus 103 in step S1005. When it is determined that the print control apparatus 101 is in print status, the process moves to step S1006. On the other hand, when it is determined that the print control apparatus 101 is not in the print status the process returns to step S1001, and waits for a next event.

In step S1006, first, the MIB polling is set to OFF to stop the polling. After setting the MIB polling to OFF, the process moves to step S1007. In step S1007, the print control apparatus 101 obtains (Get) MIB values of the image forming apparatus 102. When the values are obtained, the process moves to step S1008. In step S1008, values of each MIB object obtained (Get) from the image forming apparatus 102 are set to the values of corresponding objects of the print control apparatus 101. For example, an MIB object, "PrtMarkerLifeCount.1.1" of the image forming apparatus 102 is set to "PrtMarkerLifeCount.1.1" of the print control apparatus 101. Although synchronization of MIB values with the image forming apparatus 102 is carried out in steps S1007 and S1008, this flow is not absolutely necessary. The MIB of the image forming apparatus 102 is created in the print control apparatus 101 in the start processing shown in FIG. 7, and therefore steps S1007 and S1008 may be omitted. When the synchronization of the MIB values is completed in step S1008, the process moves to step S1009.

In step S1009, the print control apparatus 101 waits for an event packet to be sent from the image forming apparatus 102. When the print control apparatus 101 receives a print job sent from the terminal apparatus 103, the print control apparatus 101 carries out processing to convert the print job to a data format to be sent to the image forming apparatus 102, and sends the print job to the image forming apparatus 102. The print control apparatus 101 sets sending of an event to the image forming apparatus 102 to follow up and check if the print job sent from the print control apparatus 101 is properly processed. The print control apparatus 101 sets, in the image forming apparatus 102, events that involve notification and destinations of the event notification in advance, in order for the image forming apparatus 102 to notify the print control apparatus 101 of various events that will occur in job processing. In this embodiment, setting is made so as to notify the print control apparatus 101 of an event when the image forming apparatus 102 completed one job, and when a page is ejected during the job.

In step S1009, the print control apparatus 101 waits for an event packet. The event waiting is generally carried out by a print task of the print control apparatus 101, and therefore the obtaining can be done by copying from a lower layer network, or data in the event can be obtained from print processing of the print control apparatus 101.

When an event is obtained from the image forming apparatus 102 in step S1009, the process moves to step S1010, and it is determined whether or not the event obtained was the event indicating completion of printing one page. When it is determined that the event was the event indicating completion of one page, the process moves to step S1011. In step S1011, information of the print result is obtained from the event packet. The configuration of the event packet sent by the image forming apparatus 102 is the same as that of the one described in FIG. 9.

When the information obtaining in step S1011 is completed, the process moves to step S1012. In step S1012, values of the MIB object of the print control apparatus 101 are obtained. The information may also be obtained from another data region instead of the MIB.

When the values of the print control apparatus 101 are obtained, the process moves to step S1013. In step S1013, the setting value is calculated from page information. An MIB object, "PrtMarkerLifeCount", holds a value relating to information on a remaining amount of toner of the image forming apparatus 102. How much of the toner is decreased by printing in a color mode is set in advance in the print control apparatus 101. Such information on an amount of toner to be decreased may be obtained from the image forming apparatus 102 as well. For example, when an amount of a black toner that is to be decreased after carrying out black/white printing of one page is "3", three is deducted from the remaining amount of black toner held by the print control apparatus 101. When the calculation of the value to be set to the MIB is completed, the process moves to step S1014.

In step S1014, it is determined whether or not the value calculated in step S1013 is set to the MIB of the print control apparatus 101. The MIB object includes an object ("PrtMarkerLifeCount") whose value is dynamically updated, and an object ("PrtInputCurrentLevel") whose value is updated upon reaching a threshold. In the former case of the MIB value, the process moves to step S1015. In the latter case, when the calculated value does not exceed the threshold for changing the MIB value, the MIB value of the print control apparatus 101 is not updated, and the process returns to step S1009 and waits for a next event. On the other hand, when the value exceeds the threshold, the process moves to step S1015. In step S1015, the value calculated in step S1014 is set to the value of corresponding MIB of the print control apparatus 101, and the process returns to step S1009 and waits for a next event. In this embodiment, the threshold may be set in the print control apparatus 101 in advance, or may be obtained from the image forming apparatus 102. Because the update of the image forming apparatus 102 is determined by a threshold, there may be a case where an actual value differs from the threshold value. Therefore, a proper value set in another data region of the image forming apparatus 102 may be obtained instead of the value set in the MIB in step S1007.

Step S1010 is described again. When it is determined that the obtained event was not the event indicating completion of one page, the process moves to step S1016. In step S1016, it is determined whether or not the obtained event was the event of job completion. When it is determined that the event was the job completion event, the process moves to step S1017. In step S1017, the MIB polling set to OFF in step S1006 was set to ON again, and the process returns to a standby status in step S1001 and waits for a next event. On the other hand, when it is determined that the event was not print completion in step S1016, the process returns to step S1009 and waits for a next event packet to be sent from the image forming apparatus 102.

Furthermore, the print control apparatus 101 of the present invention is capable of function expansion in the case when, for example, the image forming apparatus 102 as a management target turns off (shutdown) its power. In such a case, the MIB information of the image forming apparatus 102 is obtained based on notification of turning off its power received from the image forming apparatus 102 regardless of the value of the "SnapShot" of the print control apparatus 101, that is, "valid" or "invalid". This is for the purpose of carrying out updating with the latest information, because information cannot be obtained when the power of the image forming apparatus 102 is turned off.

The scope of the present invention includes the case where an operating system (OS) running in a computer performs part or all of the actual processing based on the program (print control program) code, and the functionality of the aforementioned embodiment is realized by that processing. Furthermore, the present invention can also be applied in the case where the program code read out from the storage medium is written into a computer-readable memory provided in a function expansion card installed in the computer or a function expansion unit connected to the computer. In such a case, a CPU or the like provided in the function expansion card or the function expansion unit performs part or all of the actual processing based on the program code written in, and the functionality of the aforementioned embodiment is realized by that processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-007206, filed Jan. 16, 2008, which is hereby incorporated by reference herein in its entirety.

What is claimed is:

1. A print control apparatus that is connected to an image forming apparatus via a network, and that receives notification of a processing status of a print job in the image forming apparatus, the print control apparatus comprising:

a database configured to manage counter information of the image forming apparatus;

an obtain unit configured to periodically obtain the counter information from the image forming apparatus;

an update unit configured to update the database based on the counter information obtained by the obtain unit;

a halt unit configured to halt the periodic obtaining of the counter information by the obtain unit in response to start notification of processing based on a print job in the image forming apparatus; and a restart unit configured to restart the periodic obtaining of the counter information by the obtain unit that was halted by the halt unit in response to completion notification of processing based on the print job in the image forming apparatus, wherein the update unit updates the counter information managed in the database using the notification of the processing status of the print job obtained from the image forming apparatus while the periodic obtaining of the counter information is halted by the halt unit.

2. The print control apparatus according to claim 1, further comprising a set unit configured to set whether or not the obtaining of the counter information from the image forming apparatus is carried out periodically, wherein the obtain unit carries out the periodic obtaining of the counter information when the set unit sets the obtaining of the counter information from the image forming apparatus to be carried out periodically, and the obtain unit carries out obtaining of the counter information once at a set time when the set unit sets the obtaining of the counter information from the image forming apparatus not to be carried out periodically.

3. The print control apparatus according to claim 1, wherein the processing status of the print job in the image forming apparatus includes either one of information indicating that the image forming apparatus ejected one page and information indicating completion of printing by the image forming apparatus.

4. The print control apparatus according to claim 2, wherein the obtain unit obtains the counter information from the image forming apparatus when the image forming apparatus turns off the power thereof, regardless of the setting by the set unit.

5. A print control method that is carried out in a print control apparatus that is connected to an image forming apparatus via a network, has a database configured to manage counter information, and receives a processing status of a print job in the image forming apparatus, the method comprising the steps of:

obtaining counter information periodically from the image forming apparatus, halting the periodic obtaining of the counter information in the obtaining step in response to start notification of processing based on a print job in the image forming apparatus, restarting the periodic obtaining of the counter information by the obtaining step that was halted by the halting step in response to completion notification of processing based on the print job in the image forming apparatus, and updating the database based on the counter information obtained in the obtaining step while the periodic obtaining of the counter information is not halted by the halting step, and updating the counter information managed in the database using the notification of the processing status of the print job obtained from the image forming apparatus while the periodic obtaining of the counter information is halted by the halting step.

6. A non-transitory computer-readable medium storing a print control program that is connected to an image forming apparatus via a network for receiving notification of a processing status of a print job in the image forming apparatus, the program causing a computer to execute functions of:

obtaining periodically counter information from the image forming apparatus, updating a database that manages the counter information of the image forming apparatus based on the obtained counter information, halting the periodic obtaining of the counter information in response to start notification of processing based on a print job in the image forming apparatus, restarting the periodic obtaining of the counter information that was halted in response to completion notification of processing based on the print job in the image forming apparatus, and updating the counter information managed in the database using the notification of the processing status of the print job obtained from the image forming apparatus while the periodic obtaining of the counter information is halted.

* * * * *